(12) United States Patent
Tokumitsu

(10) Patent No.: US 8,240,972 B2
(45) Date of Patent: Aug. 14, 2012

(54) ROBOT WITH LINEARLY MOVABLE SUPPORT MEMBER ATTACHING TO GRIPPER

(75) Inventor: Takamasa Tokumitsu, Handa (JP)

(73) Assignee: Denso Wave Corporation, Tokyo (JP)

( * ) Notice: Subject to any disclaimer, the term of this patent is extended or adjusted under 35 U.S.C. 154(b) by 171 days.

(21) Appl. No.: 12/153,336

(22) Filed: May 16, 2008

(65) Prior Publication Data

US 2008/0282821 A1    Nov. 20, 2008

(30) Foreign Application Priority Data

May 17, 2007   (JP) ................................. 2007-131596
Jan. 9, 2008   (JP) ................................. 2008-002245

(51) Int. Cl.
*B25J 18/04* (2006.01)

(52) U.S. Cl. ........................ 414/744.5; 74/422; 901/15

(58) Field of Classification Search ............... 414/744.5, 414/744.7; 901/15; 74/422, 490.01; 185/37, 185/11; 187/270, 236
See application file for complete search history.

(56) References Cited

U.S. PATENT DOCUMENTS

| | | | |
|---|---|---|---|
| 4,706,515 A * | 11/1987 | Yasukawa ................... | 74/490.04 |
| 5,046,915 A * | 9/1991 | Azuma et al. ............... | 414/744.5 |
| 5,125,789 A * | 6/1992 | Farr ............................. | 414/728 |
| 5,612,603 A | 3/1997 | Kim | |
| 6,520,733 B1 * | 2/2003 | Taniyama et al. .......... | 414/749.5 |

FOREIGN PATENT DOCUMENTS

| | | |
|---|---|---|
| JP | A-62-74588 | 4/1987 |
| JP | A-7-195291 | 8/1995 |
| JP | A 9-1481 | 1/1997 |
| JP | A-2003-39372 | 2/2003 |
| JP | A 2004-156735 | 6/2004 |

OTHER PUBLICATIONS

Feb. 21, 2012 Office Action issued in Japanese Patent Application No. 2008-002245 (with translation).
Aug. 23, 2011 Office Action issued in Japanese Patent Application No. 2007-131596 (with translation).

* cited by examiner

*Primary Examiner* — Donald Underwood
(74) *Attorney, Agent, or Firm* — Oliff & Berridge, PLC

(57) ABSTRACT

In a robot, a support member is supported to an arm to be reciprocable with respect to one of first and second sides of the arm in a predetermined direction. A rotary member of a converter is coupled to a motor, and a linear movable member of the converter is contacted to the rotary member and linked to the support member. The converter works to transfer rotary motion received by the rotary member from the motor as linear motion to the linear movable member through a transfer contact portion between the rotary member and the linear movable member to thereby move the linear movable member together with the support member in the predetermined direction. The transfer contact portion between the rotary member and the linear movable member is located offset to the one of the first and second sides of the arm relative to the other thereof.

8 Claims, 12 Drawing Sheets

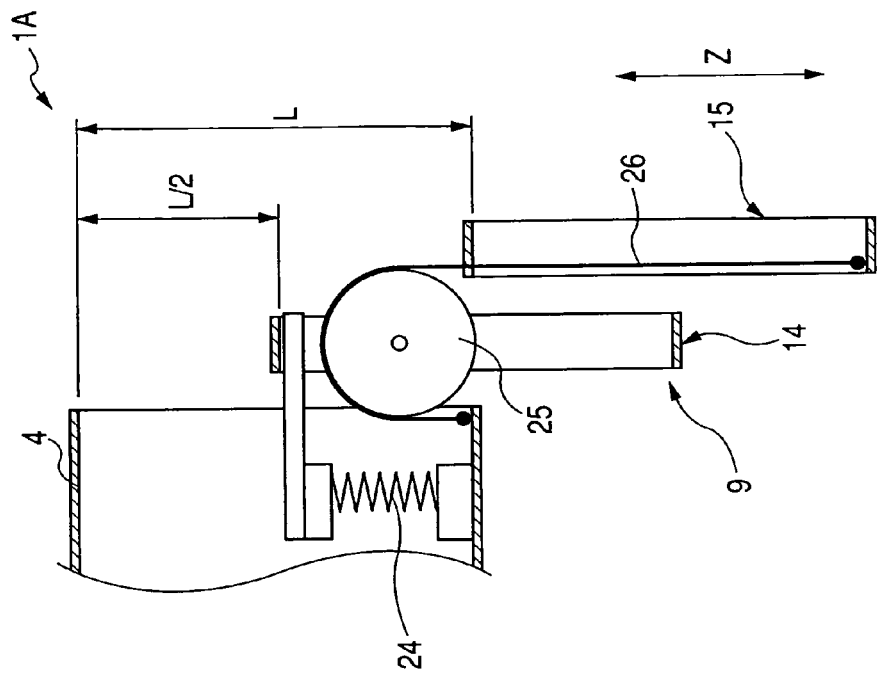
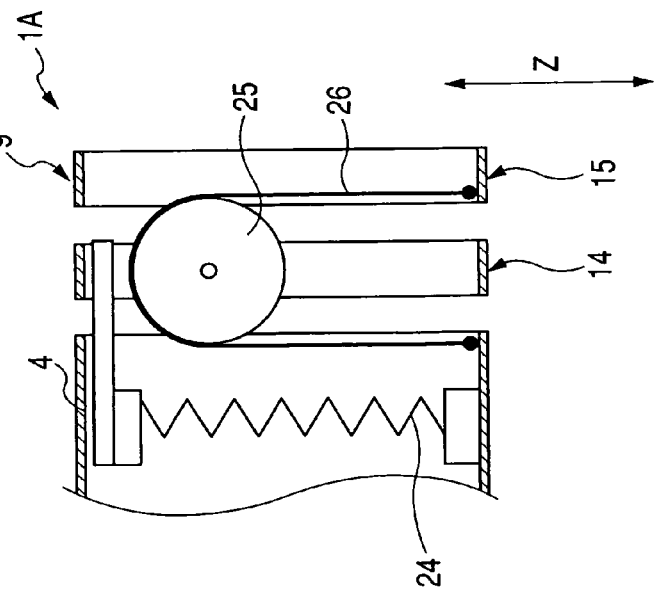

ROBOT WITH LINEARLY MOVABLE SUPPORT MEMBER ATTACHING TO GRIPPER

CROSS REFERENCE TO RELATED APPLICATIONS

This application is based on Japanese Patent Applications 2007-131596 and 2008-002245 filed on May 17, 2007 and Jan. 9, 2008, respectively. This application claims the benefit of priority from the Japanese Patent Applications, so that the descriptions of which are all incorporated herein by reference.

FIELD OF THE INVENTION

The present invention relates to robots with a linearly movable support member attaching to a gripper for gripping workpieces.

BACKGROUND OF THE INVENTION

SCARA (Selective Compliance Assembly Robot Aim) robots, in other words, horizontal multi joint robots, consist of, for instance, a base, an arm member, and a movable shaft. The arm member has one proximal end supported to the base mounted on an installation surface, such as a flooring of a factory. The movable shaft is supported to the other end of the arm member to be vertically movable and rotatable about a center axis thereof such that a higher end of the movable shaft projects from the arm member. To a lower end of the movable shaft, a gripper for gripping workpieces is attached.

An example of such SCARA robots is a SCARA robot using a ball-screw spline shaft as the movable shaft for vertically moving the gripper. Such a SCARA robot using a ball-screw spline shaft for vertically moving the gripper is for example disclosed in Japanese Patent Application Publication No. 2004-156735.

Specifically, a ball-screw nut and a ball-spline nut are rotatably mounted to the arm member away from each other in an axial direction of the ball-screw spline shaft such that the ball-screw spline shaft is threadably engaged with the ball-screw nut and ball-spline nut. The ball-screw nut and the ball-spline nut are electrically connected with an elevating motor and a swing motor, respectively.

Rotation of the ball-screw nut by the elevating motor is converted into vertical motion of the ball-screw spline shaft by screw threads formed on an outer cylindrical surface of the ball-screw spline shaft.

Rotation of the ball-spline nut by the swing motor is transferred to spline threads formed on the ball-screw spline shaft to thereby swing the ball-screw spline shaft.

SUMMARY OF THE INVENTION

In the SCARA robot using the ball-screw spline shaft for vertically moving the gripper, the ball-screw nut is required to be rotatably supported to the arm member in order to convert rotative power into vertical moving force for the ball-screw spline shaft. This may increase the length of the ball-screw nut to be supported to the arm member.

In the SCARA robot using the ball-screw spline shaft for vertically moving the gripper, movement of the ball-screw nut along the ball-screw spline shaft is also required in order to vertically move the gripper. In addition to the length of the ball-screw nut required to be rotatably supported to the arm member, more length of the ball-screw spline shaft is required in order to increase the distance between the extreme positions of travel of the gripper.

The increase in the length of the ball-screw spline shaft at least the higher end of the ball-screw spline shaft in the vertical direction however increases in the height of the ball-screw spline shaft from the arm member. The increase in the height of the ball-screw spline shaft increases a space to be occupied by the robot in the height direction of the ball-screw spline shaft. This may limit the use of the SCARA robot installed with the ball-screw spline shaft in certain environments. For example, when an SCARA robot is required to be used in locations with a narrow space thereover, such as a location having a low ceiling or a location where a crane is installed thereover, the SCARA robot installed with the ball-screw spline shaft may not be used.

In view of the background, an object of an aspect of the present invention is to provide a robot having an arm member supporting a linearly movable support member to which a gripper is attachable; this robot is capable of reducing the length of the linearly movable support member in its movable direction from the arm member.

According to one aspect of the present invention, there is provided a robot. The robot includes an arm having opposing first and second sides in a predetermined direction, and a support member supported to the arm to be reciprocable with respect to one of the first and second sides of the arm in the predetermined direction. The support member is configured such that a gripper for gripping a workpiece is attachable thereto. The robot includes a first rotary drive source installed in the arm and working to create rotary motion, and a rotary/linear motion converter. The rotary/linear motion converter includes a rotary member coupled to the first rotary drive source, and a linear movable member contacted to the rotary member and linked to the support member. The rotary/linear motion converter works to receive, by the rotary member, the rotary motion created by the first rotary drive source. The rotary/linear motion converter works to transfer the received rotary motion as linear motion to the linear movable member through a transfer contact portion between the rotary member and the linear movable member to thereby move the linear movable member together with the support member in the predetermined direction. The transfer contact portion between the rotary member and the linear movable member is located offset to the one of the first and second sides of the arm relative to the other thereof.

BRIEF DESCRIPTION OF THE DRAWINGS

Other objects and aspects of the invention will become apparent from the following description of embodiments with reference to the accompanying drawings in which:

FIG. 6A is an enlarged partially cross sectional view very schematically illustrating a part of a robot body when the linearly movable support member is located at the original position according to a second embodiment of the present invention;

FIG. 6B is an enlarged partially cross sectional view very schematically illustrating the part of the robot body when the linearly movable support member is moved downward from the original position according to the second embodiment of the present invention;

DETAILED DESCRIPTION OF EMBODIMENTS OF THE INVENTION

Embodiments of the present invention will be described hereinafter with reference to the accompanying drawings. In the embodiments, the present invention is applied to a SCARA robot.

First Embodiment

Figure 1:
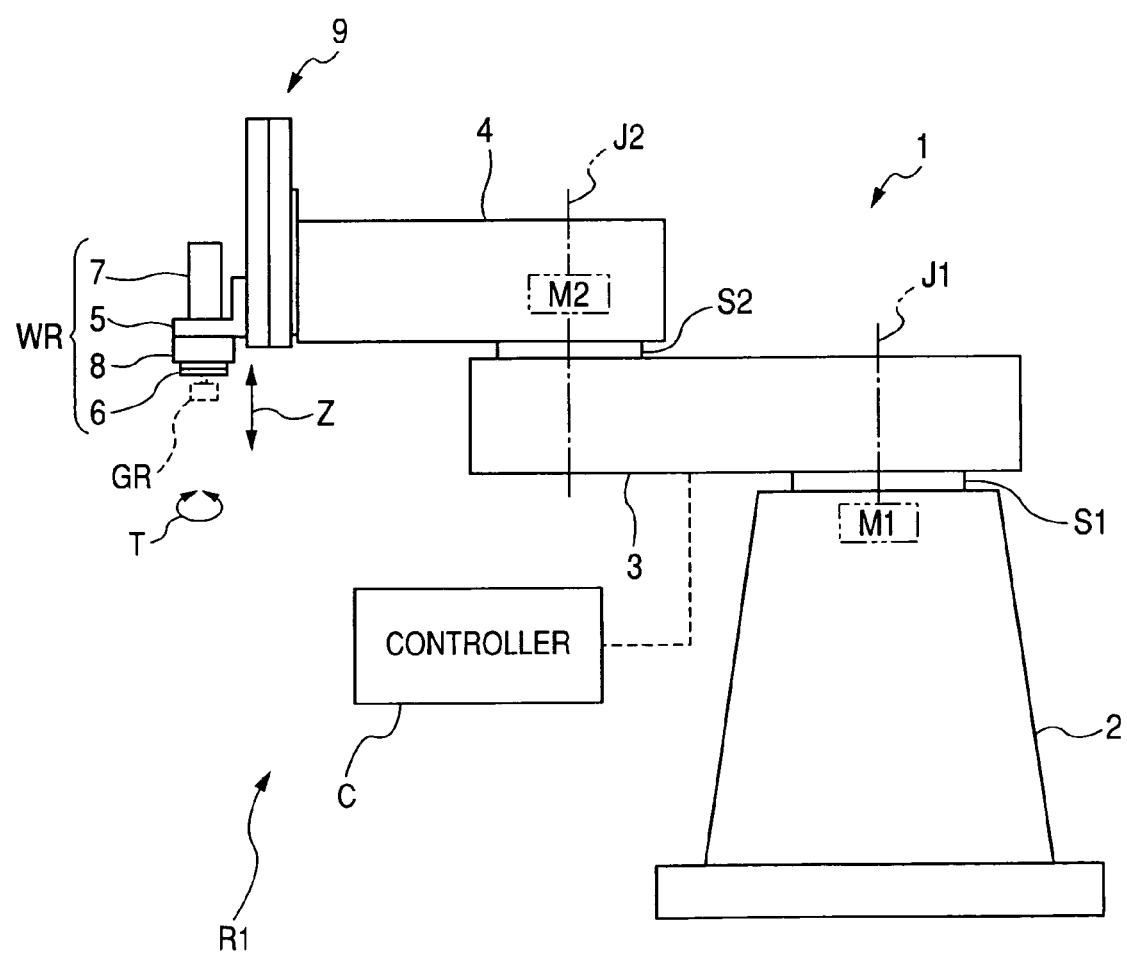
FIG. 1 is a view schematically illustrating an overall structure of a robot according to a first embodiment of the present invention.

Referring to FIG. 1, there is illustrated an example of the overall structure of a SCARA robot R1 with four axes of movement according to the first embodiment of the present invention.

The SCARA robot R1 is equipped with a robot body 1 and a controller C for controlling action of the robot body 1.

The robot body 1 consists of a base 2 mounted on an installation surface, such as a flooring of a factory. The robot body 1 also consists of a shoulder joint S1, a first arm 3, an elbow joint S2, a second arm 4, a linearly movable support member 9, an elevating member 5, and a wrist unit WR.

The base 2 has a substantially truncated pyramid or circular truncated cone.

The shoulder joint S1 has a substantially cylindrical shape and is mounted in a top portion of the base 2 such that a center axis J1 of the shoulder joint S1 is parallel to a vertical axis of the base 2 substantially orthogonal to the installation surface.

The first arm 3 has one end (proximal end) pivotally supported by the shoulder joint S1 about the center axis J1 of the base 2. The center axis J1 will be referred to as "rotation axis J1" hereinafter.

The elbow joint S2 has a substantially cylindrical shape and is mounted in the other end of the first arm 3 such that a center axis J2 of the elbow joint S2 is parallel to the rotation axis J1.

The second arm 4 has one end (proximal end) supported by the elbow joint S2. The elbow joint S2 allows the first arm 3 and the second arm 4 to pivot about the center axis J2 relative to each other. The center axis J2 will be referred to as "rotation axis J2" hereinafter.

The linearly movable support member, referred to simply as "support member", 9 is supported to a mounting wall $4w$ of the second arm 4 at the other end thereof to be linearly movable in a direction Z parallel to the rotational axes J1 and J2. Upper and lower ends $4a$ and $4b$ of the mounting wall $4w$ of the other end of the second arm 4 in the Z direction slightly projects outwardly in the longitudinal direction of the second arm 4; these projecting upper and lower ends $4a$ and $4b$ serve as stopper portions $4a$ and $4b$.

The elevating member 5 has, for instance, an L-shaped bracket. Specifically, the elevating member 5 consists of a first portion $5a$ and a second portion $5b$ integrally extending orthogonally therefrom.

The first portion $5a$ of the elevating member 5 is fixed to the support member 9 such that an outer surface of the second portion $5b$ is opposite to the installation surface and is lower than the first portion $5a$.

The wrist unit WR consists of, for example, a flange 6, a swing motor 7, and a reducer 8.

The swing motor 7 is mounted on an inner surface of the second portion $5b$ such that its shaft rotatably projects through the second portion $5b$ toward the installation surface. The controller C is connected to the swing motor 7 and operative to rotatably drive it. The reducer 8 is coaxially mounted on the projecting portion of the motor shaft.

The flange 6 is so formed on the reducer 8 as to extend toward the installation surface. To a lower end of the flange 6, a gripper GR for gripping various types of workpieces is attachable.

In the wrist unit WR, when the swing motor 7 is rotatably driven by the controller C, the flange 6 (the gripper GR attached thereto) is rotated via the reducer 8.

The robot body 1 is equipped with a motor M1 installed in the base 2. A shaft of the motor M1 is coupled to the proximal end of the first arm 3. The controller C is connected to the motor M1 and operative to rotate it together with the first arm 3 about the rotation axis J1.

The robot body 1 is also equipped with a motor M2 installed in the second arm 4. A shaft of the motor M2 is coupled to the other end of the first arm 3 and the proximal end of the second arm 4. The controller C is connected to the motor M2 and operative to rotate it together with the second arm 4 about the rotation axis J2 relative to the first arm 3.

Specifically, in the first embodiment, the SCARA robot R1 is designed to move the gripper GR attached to the lower end of the flange 6 in order to grip workpieces located lower than the second arm 4.

Figure 2:
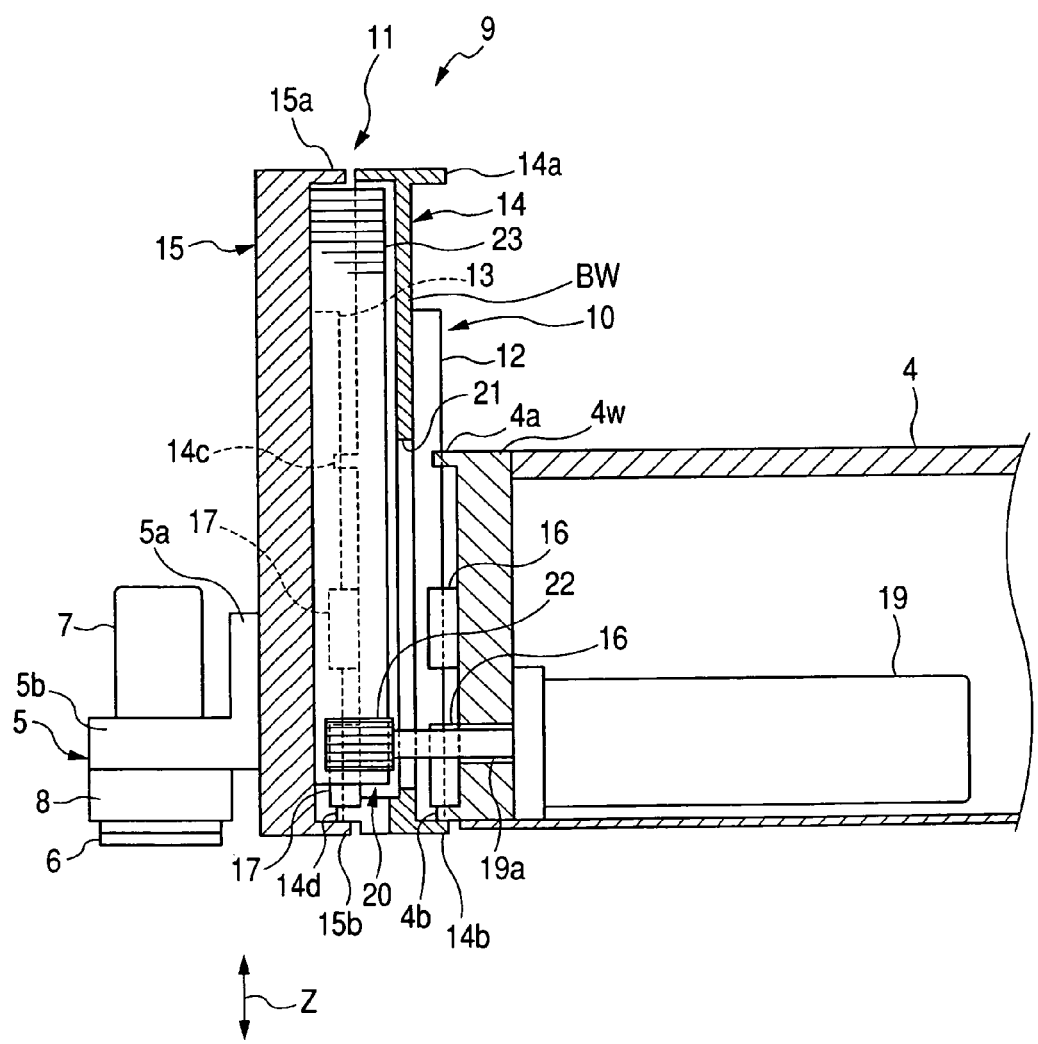
FIG. 2 is an enlarged partially cross sectional one side view schematically illustrating a linearly movable support member of the robot according to the first embodiment; this linearly movable support member is located at an original position.
Figure 3:
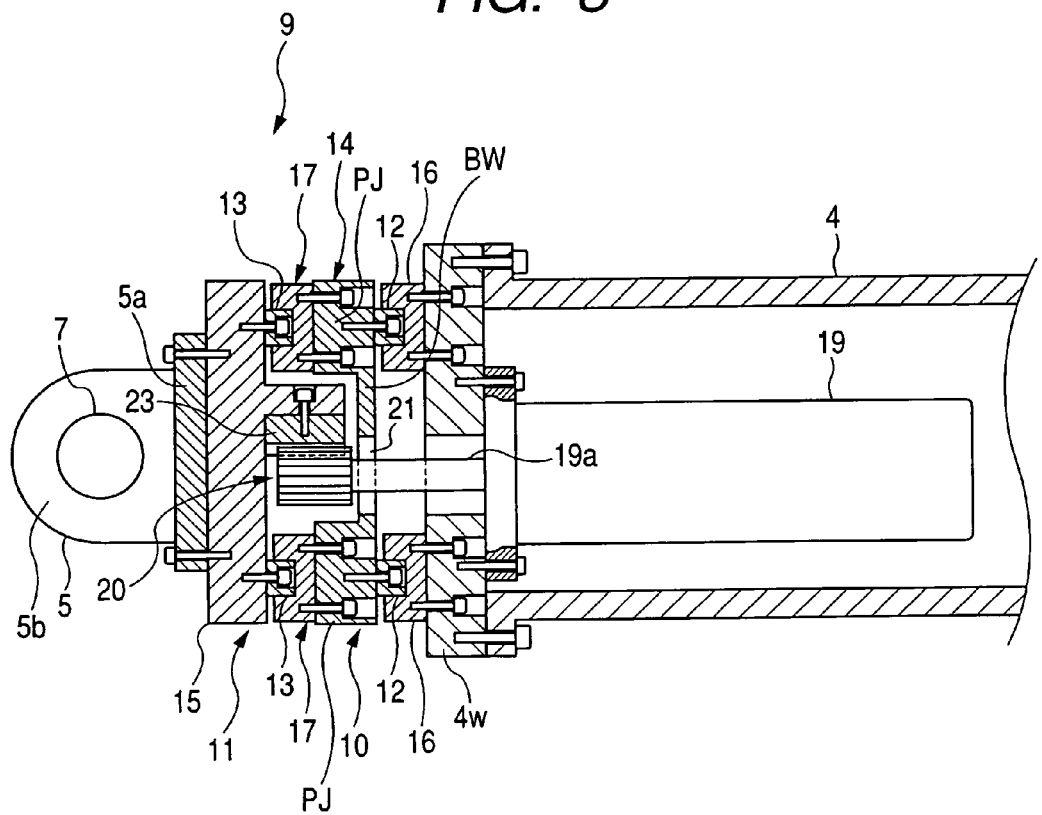
FIG. 3 is an enlarged partially cross sectional plan view of the linearly movable support member illustrated in FIG. 2.
Figure 4:
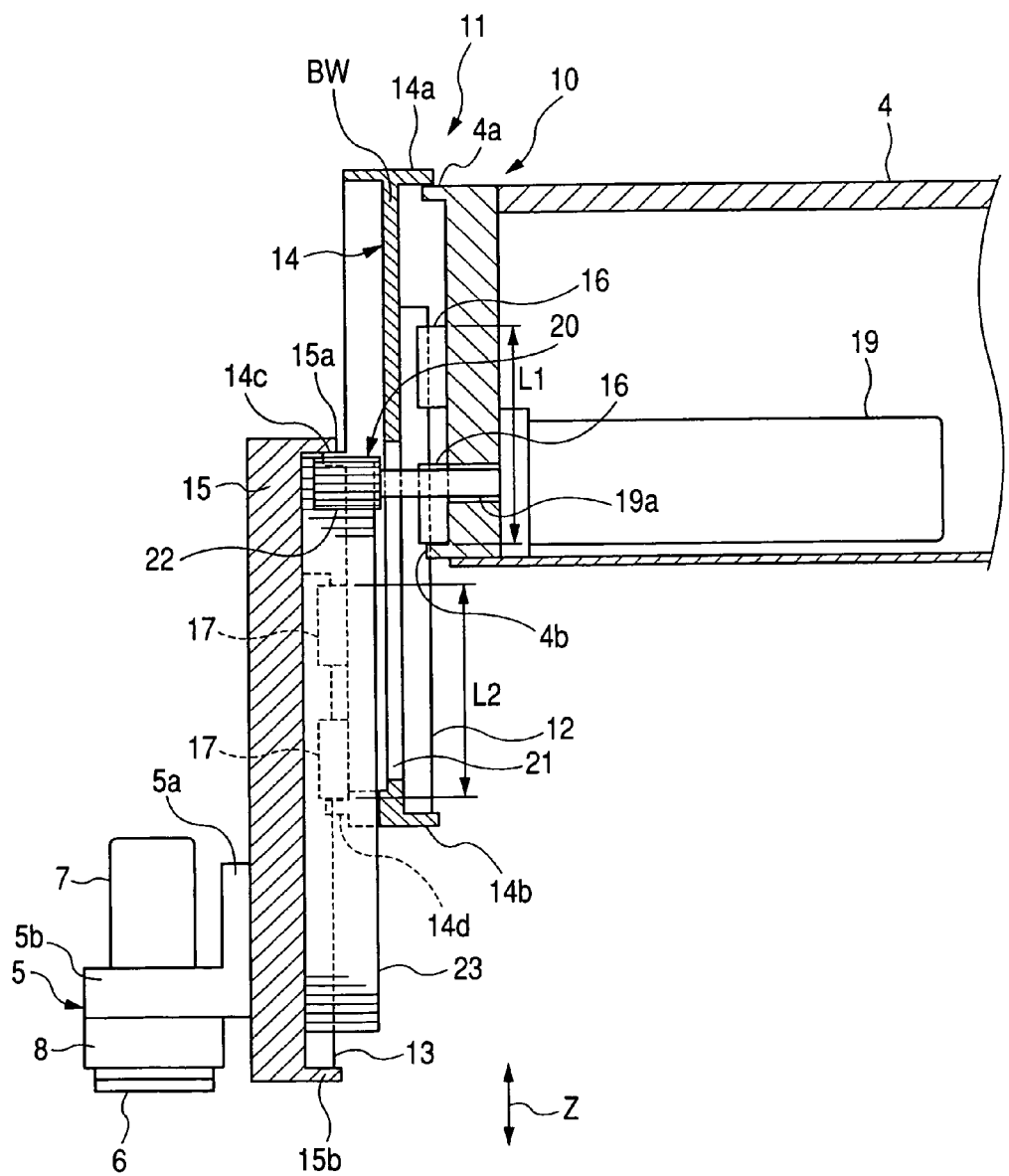
FIG. 4 is an enlarged partially cross sectional one side view of the linearly movable support member when the linearly movable support member moves downward from the original position according to the first embodiment.

Referring to FIGS. 2 to 4, the support member 9 consists of at least one pair of first and second support mechanisms 10 and 11. For example, the first and the second support mechanisms 10 and 11 are telescopically linked to each other in the Z direction.

Next, the structure of each of the first and second support mechanisms 10 and 11 will be described in detail hereinafter, and thereafter, the telescopic linkage between the first and second support mechanisms 10 and 11 will be described.

The first support mechanism 10 is made up of a first platy movable member 14 formed with a pair of first rail members 12, and two pairs of first linear guides 16.

Similarly, the second support mechanism 11 is made up of a second platy movable member 15 formed with a pair of second rail members 13 and two pairs of second linear guides 17.

Each of the first linear guides 16 includes a block 16b having a predetermined length and a substantially U-shape in a cross section orthogonal to the length direction so as to form a concave guide channel 16g therein.

The blocks 16b of the first pair of the first linear guides 16 are fixedly mounted at their outer surfaces on the middle portion of an outer surface of the mounting wall 4w in the Z direction such that their concave guide channels 16g are arranged parallel to the Z direction with an interval therebetween.

Similarly, the blocks 16b of the second pair of the first linear guides 16 are fixedly mounted at their outer surfaces on the bottom portion of the outer surface of the mounting wall 4w in the Z direction such that their concave guide channels 16g are aligned with the concave guide grooves 16g of the corresponding blocks 16b in the Z direction.

The first platy movable member 14 has a substantially U-shape in its lateral cross section to form a concave groove therein. The first platy movable member 14 is located in the Z direction such that an outer surface of a base wall BW thereof faces the concave guide grooves 16g. The first rail members 12 are arranged on the outer surface of the base wall BW of the first platy movable member 14 such that they are inserted in the corresponding concave guide grooves 16g of the respective first and second pairs to be movable in the Z direction (particularly see FIG. 5A).

In the first embodiment, each of the first linear guides 16 of each pair is for instance designed as a ball linear guide.

Figure 5A:
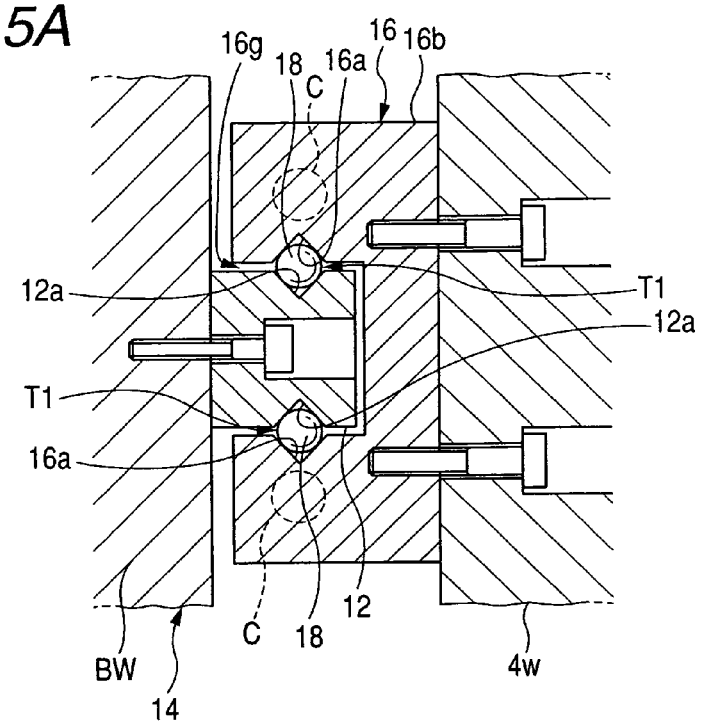
FIG. 5A is an enlarged cross sectional view schematically illustrating a coupling between a first rail member and a first linear guide of the linearly movable support member illustrated in FIGS. 2 to 4.

Specifically, as illustrated in FIG. 5A, each of the first linear guides 16 has a pair of V-grooves 16a formed in opposing inner side wall surfaces of the corresponding one of the concave guide grooves 16g. Each of the first rail members 12 has a pair of V-grooves 12a formed in its opposing outer side surfaces. When each of the first rail members 12 is inserted in the corresponding concave guide grooves 16g of each pair, the V-grooves 16a, are opposite to the V-grooves 12a to form tunnels T1.

Each of the first linear guides 16 is provided with a plurality of balls 18 rollably inserted within the tunnels T1. The balls 18 inserted within the tunnels T1 allow the first rail members 12 to be coupled to the blocks 16b and movable in the Z direction.

The block 16b of each of the first linear guides 16 of each pair is formed with circulation paths C each communicating with a corresponding one of the tunnels T1. When the plurality of balls 18 roll through a corresponding one tunnel T1 with movement of the corresponding first rail member 12 in the Z direction, a corresponding one circulation path C allows the balls 18 to:

exit from the corresponding one tunnel T1;
circulate therethrough; and
reenter into the corresponding one tunnel T1.

Each of the second linear guides 17 includes a block 17b having a predetermined length and a substantially U-shape in a cross section orthogonal to the length direction so as to form a concave guide channel 17g therein.

The blocks 17b of the first pair of the second linear guides 17 are fixedly mounted at their outer surfaces on the middle portion of surfaces of projections PJ from the base wall BW of the first platy movable member 14 in the Z direction such that their concave guide channels 17g are arranged parallel to the Z direction with an interval therebetween.

Similarly, the blocks 17b of the second pair of the second linear guides 17 are fixedly mounted at their outer surfaces on the bottom portion of the surfaces of the projections PJ of the first platy movable member 14 in the Z direction such that their concave guide channels 17g are aligned with the concave guide grooves 17g of the corresponding blocks 16b in the Z direction.

The second platy movable member 15 is located in the Z direction such that its one (inner) major surface faces the concave guide grooves 17g. The second rail members 13 are arranged on the one major surface of the second platy movable member 15 such that they are inserted in the corresponding concave guide grooves 17g of the respective first and second pairs to be movable in the Z direction (particularly see FIG. 5B).

In the first embodiment, each of the second linear guides 17 of each pair is for instance designed as a ball linear guide.

Figure 5B:
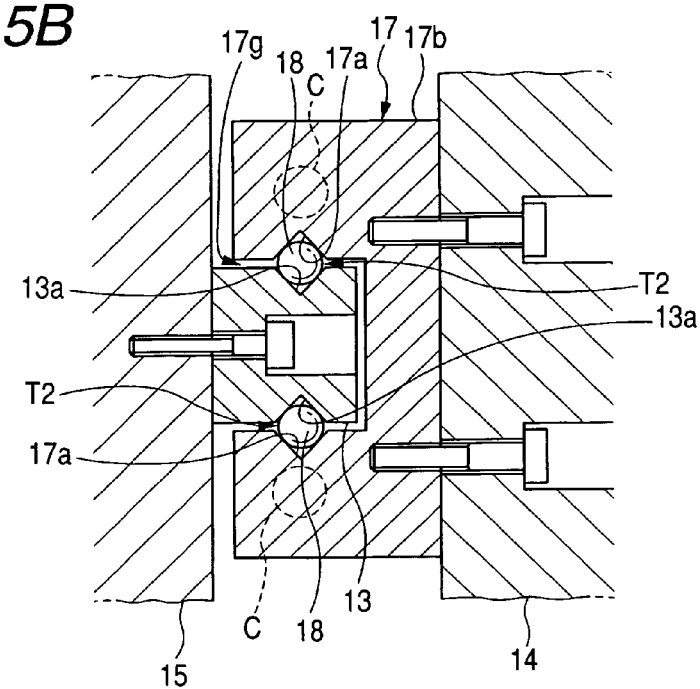
FIG. 5B is an enlarged cross sectional view schematically illustrating a coupling between a second rail member and a second linear guide of the linearly movable support member illustrated in FIGS. 2 to 4.

Specifically, as illustrated in FIG. 5B, each of the second linear guides 17 has a pair of V-grooves 17a formed in opposing inner side wall surfaces of the corresponding one of the concave guide grooves 17g. Each of the second rail members 13 has a pair of V-grooves 13a formed in its opposing outer side surfaces. When each of the second rail members 13 is inserted in the corresponding concave guide grooves 17g of each pair, the V-grooves 17a are opposite to the V-grooves 13a to form tunnels T2.

Each of the second linear guides 17 is provided with a plurality of balls 18 rollably inserted within the tunnels T2. The balls 18 inserted within the tunnels T2 allow the second rail members 13 to be coupled to the blocks 17b and movable in the Z direction.

The block 17b of each of the second linear guides 17 of each pair is formed with circulation paths C each communicating with a corresponding one of the tunnels T2. When the plurality of balls 18 roll through a corresponding one tunnel T2 with movement of the corresponding second rail member 13 in the Z direction, a corresponding one circulation path C allows the balls 18 to:

exit from the corresponding one tunnel T2;
circulate therethrough; and
reenter into the corresponding one tunnel T2.

Specifically, in the configurations of the first and second support mechanisms 10 and 11, the second platy movable member 15 is supported by the second linear guides 17 mounted on the surfaces of the projections PJ of the first platy movable member 14 to be movable in the Z direction. In addition, the first platy movable member 14 is supported by the first linear guides 16 mounted on the outer surface of the mounting wall 4w of the second arm 4 to be movable in the Z direction.

In other words, the first and second platy movable members 14 and 15 are telescopically supported to the other end of the second arm 4 in the Z direction.

The first portion 5a of the elevating member 5 is so mounted on the lower end of the other major surface of the second platy movable member 15 in the Z direction as to be telescopically supported by the support member 9.

The robot body 1 is further provided with an elevating motor 19 serving as a source for individually elevating the first and second platy movable members 14 and 15, and with a rack and pinion 20 as an example of rotary/linear motion converters. The controller C is connected to the elevating motor 19 and operative to rotatably drive it.

The elevating motor 19 works to create rotary motion under control of the controller C, and the rack and pinion 20 works to convert the rotary motion created by the elevating motor 19 into linear motion of the first and second platy movable member 14 and 15.

Specifically, the elevating motor 19 is installed in the second arm 4 close to the lower portion of the mounting wall 4w. The drive shaft 19a of the elevating motor 19 rotatably projects through the lower portion of the mounting wall 4w and through an elongated hole 21 formed through the base wall BW of the first platy movable member 14. The drive shaft 19a extends up to the interior of the concave groove formed by the first platy movable member 14 in front of the one major surface of the second platy movable member 15 in a manner that it does not interfere with the first linear guides 16.

A pinion 22 of the rack and pinion 20 is on the projecting end of the drive shaft 19a so that the pinion 22 is rotated by rotation of the drive shaft 19a of the elevating motor 19.

The second platy movable member 15 is formed at its one major surface with a mounting wall such that the mounting wall is located inside of the concave groove formed by the first platy movable member 14 while it does not interfere with the second linear guides 17. A rack (toothed bar) 23 is mounted at its back surface opposing the toothed portion on the mounting wall such that the rack 23 is engaged with the teeth of the pinion 22.

The mating portion between the rack 23 and pinion 22, in other words, a transfer contact portion between the rack 23 and pinion 22 for transferring rotary motion of the pinion 22 to the rack 23 as linear motion is located close to the lower portion of the mounting wall 4w of the robot 4. This is because the elevating motor 19 is installed in the second arm 4 close to the lower portion of the mounting wall 4w of the robot 4.

In the first embodiment, in order to prevent the first rail members 12 from exiting from the first linear guides 16 fixed to the second arm 4, upper and lower ends 14a and 14b of the outer surface of the base wall BW of the first platy movable member 14 project toward the second arm 4 so as to allow abutment on the stopper portions 4a and 4b. The projecting upper and lower ends 14a and 14b serve as stopper portions 14a and 14b for stopping elevation of the first platy movable member 14 in cooperation with the stopper portions 4a and 4b.

Middle portion and lower end of the surface of each of the projections PJ of the first platy movable member 14 project toward the second arm 4; these middle portion and lower end serve as stopper portions 14c and 14d, respectively.

In order to prevent the second rail members 13 from exiting from the second linear guides 17 fixed to the first platy movable member 14, upper and lower ends 15a and 15b of the inner major surface of the second platy movable member 15 project toward the first platy movable member 14 so as to allow abutment on the stopper portions 14c and 14d. The projecting upper and lower ends 15a and 15b serve as stopper portions 15a and 15b for stopping elevation of the second platy movable member 15 in cooperation with the stopper portions 14c and 14d.

Next, operations of the robot R1 in elevating the elevating member 5 (the gripper GR) will be described hereinafter.

In non-operating state of the robot R1, in the first support mechanism 10, the first platy movable member 14 is located such that its lower stopper 14b slightly abuts on the bottom side of the lower stopper 4b of the second arm 4. In the non-operating state of the robot R1, in the second support mechanism 11, the second platy movable member 15 is located such that its lower stopper 15b slightly abuts on the bottom side of the lower stopper 14d of the first platy movable member 14.

In other words, in the non-operating state of the robot R1, the first and second platy movable members 14 and 15 are located at original positions corresponding the highest possible positions (maximum contraction positions) in FIG. 2. When the first and second platy movable members 14 and 15 are located at the original positions, the support member 9 is also located at an original position.

From the non-operating state of the robot R1, in order to grip a workpiece by the gripper GR, the controller C drives at least one of the motors M1 and M2 to swing at least one of the first and second arms 3 and 4 to thereby locate the gripper GR directly over the workpiece to be gripped.

Thereafter, the controller C drives the elevating motor 19 to positively rotate it in order to lower the support member 9 and the gripper GR. This rotates the pinion 22, and the rotary motion of the pinion 22 is converted to lower motion of the rack 23, resulting that the second platy movable member 15 is lowered in such a manner that the second rail members 13 are guided along the second linear guides 17.

At that time, the first platy movable member 14 is lowered by its own weight integrally with the second platy movable member 15 in such a manner that the first rail members 12 are guided along the first linear guides 16.

Thereafter, when the first platy movable member 14 is lowered until its upper stopper 14a abuts on the top side of the upper stopper 4a of the second arm 4, the lower movement of the first platy movable member 14 is stopped. Thereafter, as illustrated in FIG. 4, the second platy movable member 15 is lowered alone in such a manner that the second rail members 13 are guided along the second linear guides 17.

When the second platy movable member 15 is lowered so that the gripper GR reaches a proper position to grip the workpiece, the controller C deactivates the elevating motor 19 to stop it. Thereafter, the workpiece is gripped by the gripper GR.

Note that, as described above, the second platy movable member 15 can be lowered to the lowest possible position (the maximum extension position) so that its upper stopper 15a abuts on the top side of each of the middle stoppers 14c of the first platy movable member 14. FIG. 4 illustrates a state where the second platy movable member 15 is lowered to the lowest possible position.

After the workpiece being gripped by the gripper GR, the controller C drives the elevating motor 19 to negatively rotate it so as to raise the support member 9. This rotates the pinion 22, and the rotary motion of the pinion 22 is converted to upper motion of the rack 23, resulting that the second platy movable member 15 is moved upward in such a manner that the second rail members 13 are guided along the second linear guides 17.

When the second platy movable member 15 is moved upward until its lower stopper 15b abuts on the bottom side of each of the lower stoppers 14d of the first platy movable member 14, the upper movement of the second platy movable member 15 raises the first platy movable member 14 in such a manner that the first rail members 12 are guided along the first linear guides 16. This results that the first and second platy movable members 14 and 15 are integrally moved upward.

Thereafter, when the first platy movable member 14 is moved upward until its lower stopper 14b slightly abuts on the bottom side of the lower stopper 4b of the second arm 4, the controller C deactivates the elevating motor 19 to stop it. This results that the first and second platy movable members 14 and 15 are returned to their original positions illustrated in FIG. 2.

As described above, the support member 9 of the robot R1 according to the first embodiment is supported to the other end of the second arm 4 to be reciprocable in the Z direction and configured to support the elevating member 5.

Specifically, the first support mechanism 10 of the support member 9 is attached to the other end of the second arm 4 and configured to support by the first linear guides 16 the first platy movable member 14 to be reciprocable in the Z direction. In addition, the second support mechanism 11 of the support member 9 is attached to the first platy movable member 14 and configured to support by the second linear guides 17 the second platy movable member 15 to be movable in the Z direction. The elevating member 5 to which the gripper GR is attachable is fixed to the second platy movable member 15.

The supporting span between the two pairs of the first linear guides 16 required to support the first platy movable member 14 to be movable in the Z direction is determined as follows. Specifically, the determined supporting span between the two pairs of the first linear guides 16 allows support of the weight of the first platy movable member 14, the second support mechanism 11, the elevating member 5, the swing motor 7, the reducer 8, the gripper GR, and a workpiece. The supporting span between the two pairs of the first linear guides 16 is represented by reference character L1 in FIG. 4.

Similarly, the supporting span between the two pairs of the second linear guides 17 required to support the second platy movable member 15 to be movable in the Z direction is determined as follows. Specifically, the determined supporting span between the two pairs of the second linear guides 17 allows support of the weight of the second platy movable member 15, the elevating member 5, the swing motor 7, the reducer 8, the gripper GR, and a work. The supporting span between the two pairs of the second linear guides 17 is represented by reference character L2 in FIG. 4.

Specifically, the supporting span L1 between the two pairs of the first linear guides 16 and the supporting span L2 between the two pairs of the second linear guides 17 are determined without consideration of rotatably supporting the support member 9 by the second arm 4. For this reason, it is possible to reduce the supporting span L1 between the two pairs of the first linear guides 16 and the span L2 between the two pairs of the second linear guides 17.

In the non-operating state of the robot R1, the first platy movable member 14 is located at the original position such that its lower end is close to the lower end of the second arm 4. In the operating state of the robot R1, the first platy movable member 14 can be lowered from the original position until its upper end is close to the upper end of the second arm 4. Similarly, in the non-operating state of the robot R1, the second platy movable member 15 is located at the original position such that its lower end is close to the lower end of the first platy movable member 14. In the operating state of the robot R1, the second platy movable member 15 can be lowered from the original position until its upper end is close to the middle portions of the first platy movable member 14 in the Z direction.

Specifically, the stroke of the first platy movable member 14 in the Z direction can fully use the length thereof in the Z direction. Similarly, the stroke of the second platy movable member 15 in the Z direction can fully use the length thereof in the Z direction.

Thus, it is possible to reduce the lengths of the first and second platy movable members 14 and 15 in the Z direction; these lengths of the first and second platy movable members 14 and 15 are needed to ensure a sufficient stoke in the Z direction required for the elevating member 5.

In the first embodiment, in the non-operating state of the robot R1, the transfer contact portion between the rack 23 and pinion 22 for transferring rotary motion of the pinion 22 to the rack 23 is located offset to the lower portion of the second arm 4 relative to the upper portion thereof. In the operating state of the robot R1, the rack 23 can be lowered until the transfer contact portion between the rack 23 and pinion 22 is located close to the upper end of the second platy movable member 15 (FIG. 4).

Specifically, the stroke of the rack 23 in the Z direction can fully use the length thereof in the Z direction. Thus, it is possible to reduce the length of the rack 23 in the Z direction; this length of the rack 23 is needed to ensure the sufficient stoke in the Z direction required for the elevating member 5.

In addition, in the first embodiment, the first and second platy movable members 14 and 15 are telescopically supported to the other end of the second arm 4 in the Z direction. For this reason, as compared with a structure in which the first and second platy movable members 14 and 15 are non-telescopically supported to the other end of the second arm 4 in the Z direction, the total length of the robot R1 in the non-operating state in which the first and second platy movable members 14 and 15 are located at the original positions are reduced.

In summary, when the first and second platy movable members 14 and 15 are located to the original positions, the length of each of the first and second platy movable members 14 and 15 in the Z direction projecting from the second arm 4 is reduced as compared with the conventional SCARA robot using a ball-screw spline shaft. For this reason, it is possible to improve the use of the robot R1 installed with the support member 9. For example, even if the robot R1 is required to be used in locations with a narrow space thereover, such as a location having a low ceiling or a location where a crane is installed thereover, it is possible to smoothly install the robot R1 in the locations with a narrow space thereover.

In addition, in the first embodiment, the first platy movable member 14 and the second platy movable member 15 are respectively supported by the first and second linear guides 16 and 17 via the first and second rail members 12 and 13 to be movable in the Z direction. This simplifies the configuration to support the first and second platy movable members 14 and 15 to be movable in the Z direction, and obtains the stable support state of each of the first and second platy movable members 14 and 15.

Even if the first and second platy movable members 14 and 15 are located at the lowest possible positions (the maximum extension positions), the first platy movable member 14 and the second platy movable member 15 are respectively supported by the full lengths of the first and second linear guides 16 and 17 in the Z direction. This allows each of the first and second platy movable members 14 and 15 to be more stably supported by the respective first and second linear guides 16 and 17.

Second Embodiment

A robot according to the second embodiment of the present invention will be described hereinafter. The robot of the second embodiment has substantially the same structure as that of the robot R1 of the first embodiment except for some differences described hereinafter. For this reason, like reference characters are assigned to like parts in the robots according to the first and second embodiments so that descriptions of the parts of the robot of the second embodiment will be omitted or simplified.

FIG. 6A very schematically illustrates a robot body 1A of the robot according to the second embodiment.

The robot body 1A is designed such that, when the support member 9 is lowered from its original position, the operating rate of the first platy movable member 14 is substantially the same as that of the second platy movable member 15.

Specifically, the robot body 1A is provided with a compression coil spring 24 as an example of biasing members. The compression coil spring 24 is inserted between an inner bottom surface of the other end of the second arm 4 and the upper end of the first platy movable member 14 so as to bias the first platy movable member 14 to the original position.

The robot body 1A is also provided with a pulley 25 supported to, for example, the first platy movable member 14 to be rotatable in a plane parallel to the length direction of the second arm 4 and the Z direction. The robot body 1A is further provided with a belt 26 mounted on the pulley 25 from the top thereof. One end of the belt 26 is coupled to the lower end of the second arm 4, and the other end thereof is coupled to the lower end of the second platy movable member 15. The configuration allows the biasing force by the compression coil spring 24 to pull downward the belt 26 and the pulley 26.

Specifically, the compression coil spring 24, the pulley 25, and the belt 26 constitute a moving pulley mechanism.

In the second embodiment, when the second platy movable member 15 is lowered by a predetermined distance L in the Z direction, the moving pulley mechanism allows the first platy movable member 14 to fall simultaneously with the lower movement of the second platy movable member 15 by the half (L/2) of the moving distance L thereof (see FIG. 6B).

In other words, when the second platy movable member 15 is lowered by a predetermined distance L in the Z direction, the lower stroke "L/2" of the first platy movable member 14 with respect to the second arm 14 is substantially the same as the lower stroke "L/2" of the second platy movable member 15 with respect to the first platy movable member 14.

For this reason, even if the elevating member 5 (the gripper GR) is required to be lowered by a short distance, the first platy movable member 14 and the second platy movable member 15 are simultaneously lowered by the same distance with respect to the second arm 4 and the first platy movable member 14, respectively. This makes it possible to equalize the operation rate of the first platy movable member 14 and that of the second platy movable member 15.

Third Embodiment

A robot according to the third embodiment of the present invention will be described hereinafter. The robot of the third embodiment has substantially the same structure as that of the robot R1 of the first embodiment except for some differences described hereinafter. For this reason, like reference characters are assigned to like parts in the robots according to the first and third embodiments so that descriptions of the parts of the robot of the third embodiment will be omitted or simplified.

Figure 7:
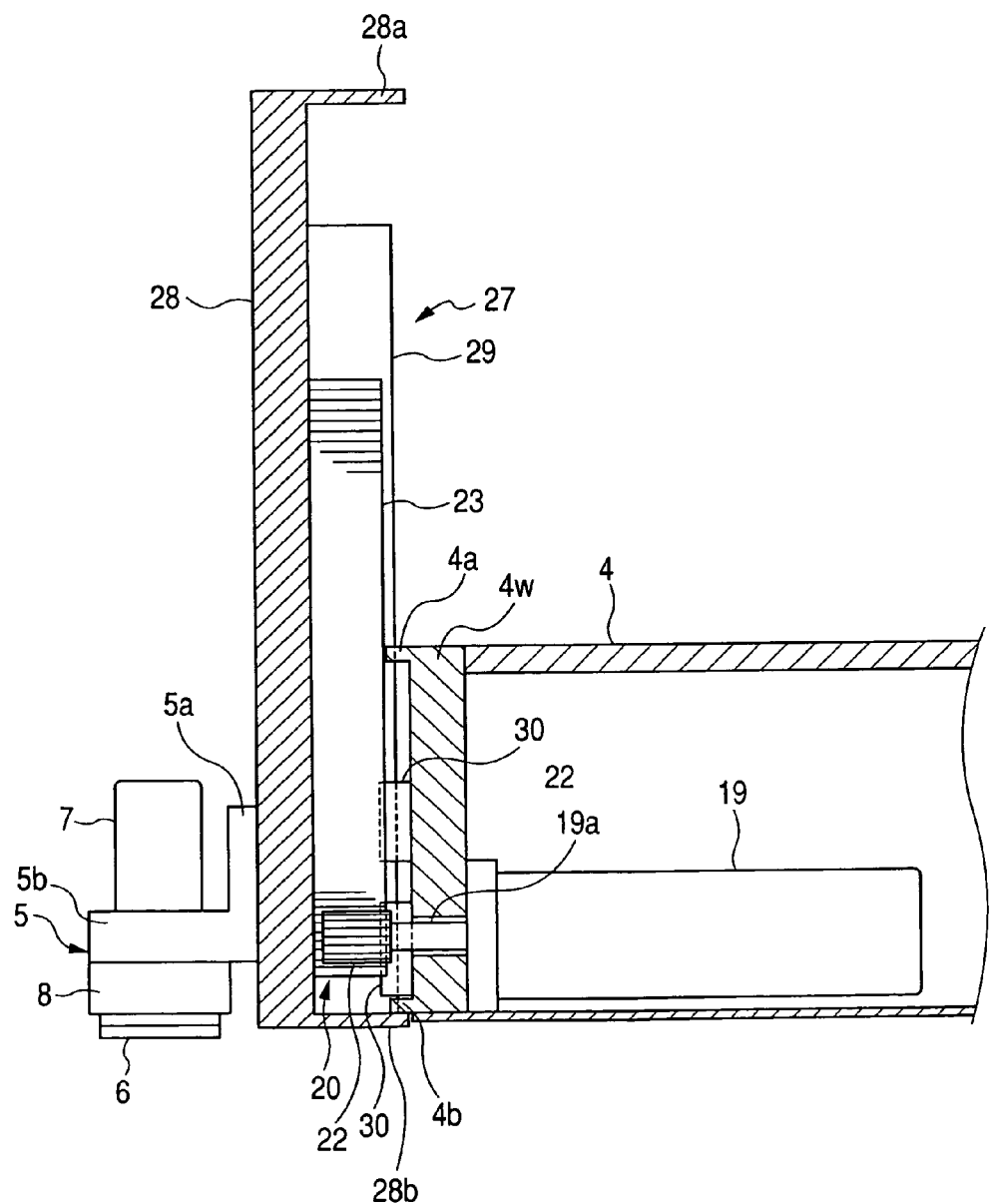
FIG. 7 is an enlarged partially cross sectional one side view schematically illustrating a linearly movable support member of a robot according to a third embodiment of the present invention; this linearly movable support member is located at an original position.

FIG. 7 schematically illustrates a support member 9A of the robot according to the third embodiment.

The support member 9A is designed by a single support mechanism 27.

The single support mechanism 27 is made up of a platy movable member 28 formed with a pair of rail members 29, and two pairs of linear guides 30.

Each of the linear guides 30 has substantially the same structure as that of the first linear guides 16.

Blocks 30b of one pair of the linear guides 30 are fixedly mounted at their outer surfaces on the middle portion of an outer surface of the mounting wall 4w in the Z direction such that their concave guide channels are arranged parallel to the Z direction with an interval therebetween.

Similarly, the blocks 30b of the other pair of the linear guides 30 are fixedly mounted at their outer surfaces on the bottom portion of the outer surface of the mounting wall 4w in the Z direction such that their concave guide channels are aligned with the concave guide grooves of the corresponding blocks 30b in the Z direction.

The platy movable member 27 is located in the Z direction such that its one (inner) major surface faces the concave guide grooves of the blocks 30b. The rail members 29 are arranged on the one major surface of the platy movable member 27 such that they are inserted in the corresponding concave guide grooves of respective pairs of the linear guides 30 to be movable in the Z direction.

In the third embodiment, each of the linear guides 30 of each pair is for instance designed as a ball linear guide as well as the first and second linear guides 16 and 17 of the first embodiment.

The first portion 5a of the elevating member 5 is so mounted on the lower end of the other major surface of the platy movable member 28 in the Z direction.

In the third embodiment, the elevating motor 19 works to create rotary motion under control of the controller C, and the rack and pinion 20 works to convert the rotary motion created by the elevating motor 19 into linear motion of the platy movable member 28.

Specifically, the drive shaft 19a of the elevating motor 19 rotatably projects through the lower portion of the mounting wall 4w. The drive shaft 19a extends up to in front of the one major surface of the platy movable member 28 in a manner that it does not interfere with the linear guides 30.

Like the second platy movable member 15, the platy movable member 30 is formed at its one major surface with a mounting wall. The rack 23 is mounted at its back surface on the mounting wall such that the rack 23 is engaged with the teeth of the pinion 22.

The mating portion between the rack 23 and pinion 22, in other words, a transfer contact portion between the rack 23 and pinion 22 for transferring rotary motion of the pinion 22 to the rack 23 is located close to the lower end of the platy movable member 28.

In the third embodiment, in order to prevent the rail members 29 from exiting from the linear guides 30 fixed to the second arm 4, upper and lower ends 28a and 28b of the platy movable member 28 project toward the second arm 4 so as to allow abutment on the stopper portions 4a and 4b. The projecting upper and lower ends 28a and 28b serve as stopper portions 28a and 28b for stopping elevation of the platy movable member 28 in cooperation with the stopper portions 28a and 28b.

In non-operating state of the robot according to the third embodiment, the platy movable member 28 is located at an original position such that its lower stopper 28b slightly abuts on the bottom side of the lower stopper 4b of the second arm 4.

From the non-operating state of the robot, the controller C drives the elevating motor 19 to positively rotate it in order to lower the support member 9 and the gripper GR. This rotates the pinion 22, and the rotary motion of the pinion 22 is converted to lower motion of the rack 23, resulting that the platy movable member 28 is lowered in such a manner that the rail members 29 are guided along the linear guides 30.

Thereafter, when the platy movable member 28 is lowered so that the gripper GR reaches a proper position to grip the workpiece, the controller C deactivates the elevating motor 19 to stop it. Thereafter, the workpiece is gripped by the gripper GR.

Figure 8:
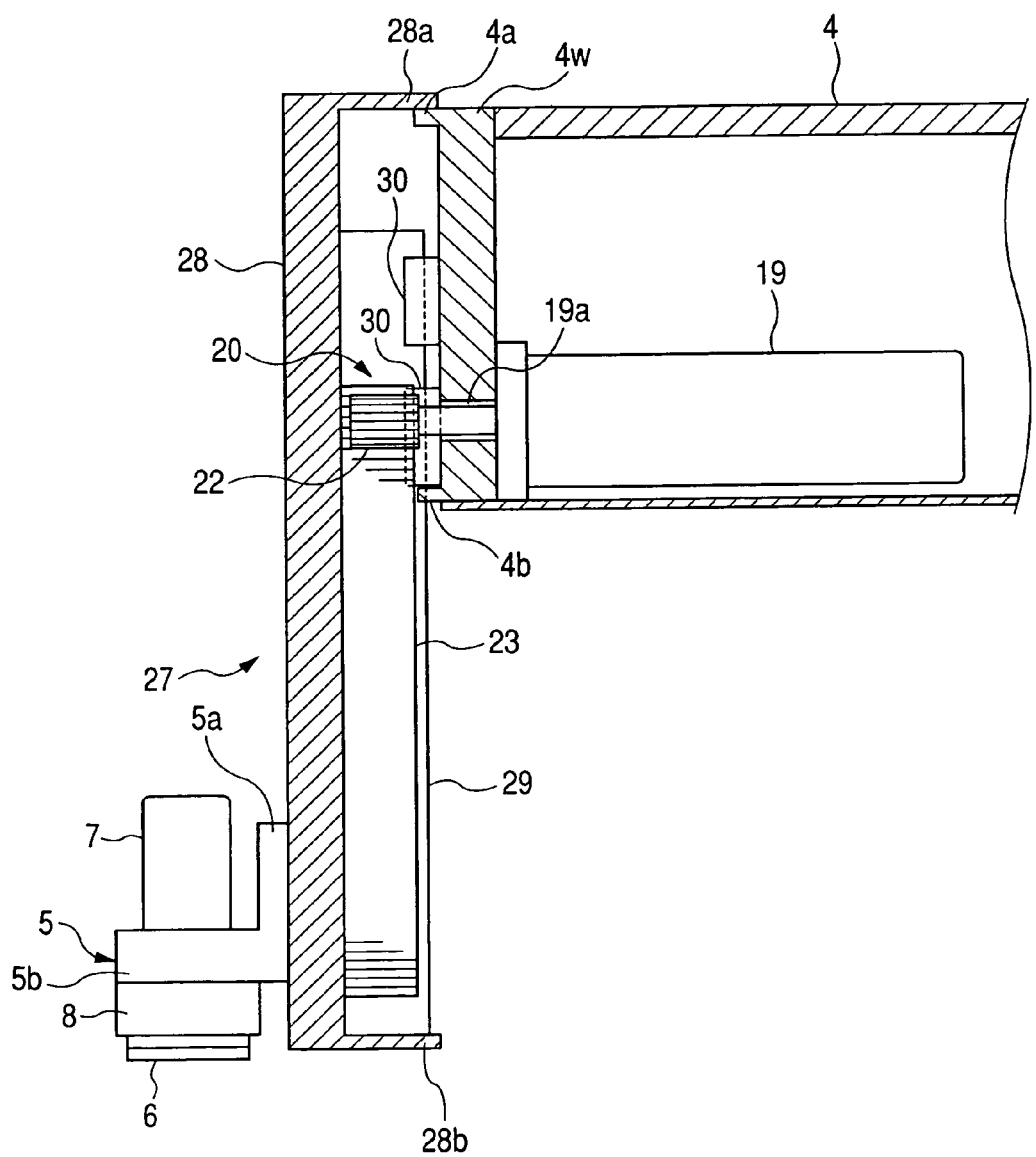
FIG. 8 is an enlarged partially cross sectional one side view of the linearly movable support member when the linearly movable support member moves downward from the original position according to the third embodiment.

The platy movable member 28 can be lowered to the lowest possible position so that its upper stopper 28a abuts on the top side of the upper stopper 4a of the second arm 4. FIG. 8 illustrates a state where the platy movable member 28 is lowered to the lowest possible position.

After the workpiece being gripped by the gripper GR, the controller C drives the elevating motor 19 to negatively rotate it so as to raise the support member 9A. This rotates the pinion 22, and the rotary motion of the pinion 22 is converted to upper motion of the rack 23, resulting that the platy movable member 28 is moved upward in such a manner that the rail members 29 are guided along the linear guides 30.

Thereafter, when the platy movable member 28 is moved upward until its lower stopper 28b slightly abuts on the bottom side of the lower stopper 4b of the second arm 4, the controller C deactivates the elevating motor 19 to stop it. This results that the platy movable member 28 is returned to its original position illustrated in FIG. 7.

In the support member 9A of the robot according to the third embodiment, the supporting span between the two pairs of the linear guides 30 required to support the platy movable member 28 to be movable in the Z direction is determined as follows. Specifically, the determined supporting span between the two pairs of the linear guides 30 allows support of the weight of the platy movable member 28, the elevating member 5, the swing motor 7, the reducer 8, the gripper GR, and a workpiece.

Specifically, the supporting span between the two pairs of the linear guides 30 is determined without consideration of rotatably supporting the support member 9 by the second arm 4. For this reason, it is possible to reduce the supporting span between the two pairs of the linear guides 30.

In the non-operating state of the robot, the platy movable member 28 is located at the original position such that its lower end is close to the lower end of the second arm 4. In the operating state of the robot, the platy movable member 28 can be lowered from the original position until its upper end is close to the upper end of the second arm 4.

Specifically, the stroke of the platy movable member 28 in the Z direction can fully use the length thereof in the Z direction.

Thus, it is possible to reduce the length of the platy movable member 28 in the Z direction; this length of the platy movable member 28 is needed to ensure a sufficient stoke in the Z direction required for the elevating member 5.

In each of the first to third embodiments, the support member 9 of the robot is designed to be telescopically moved downward from its original position in order to grip workpieces by the gripper GR, but the present invention is not limited to the structure.

Figure 9:
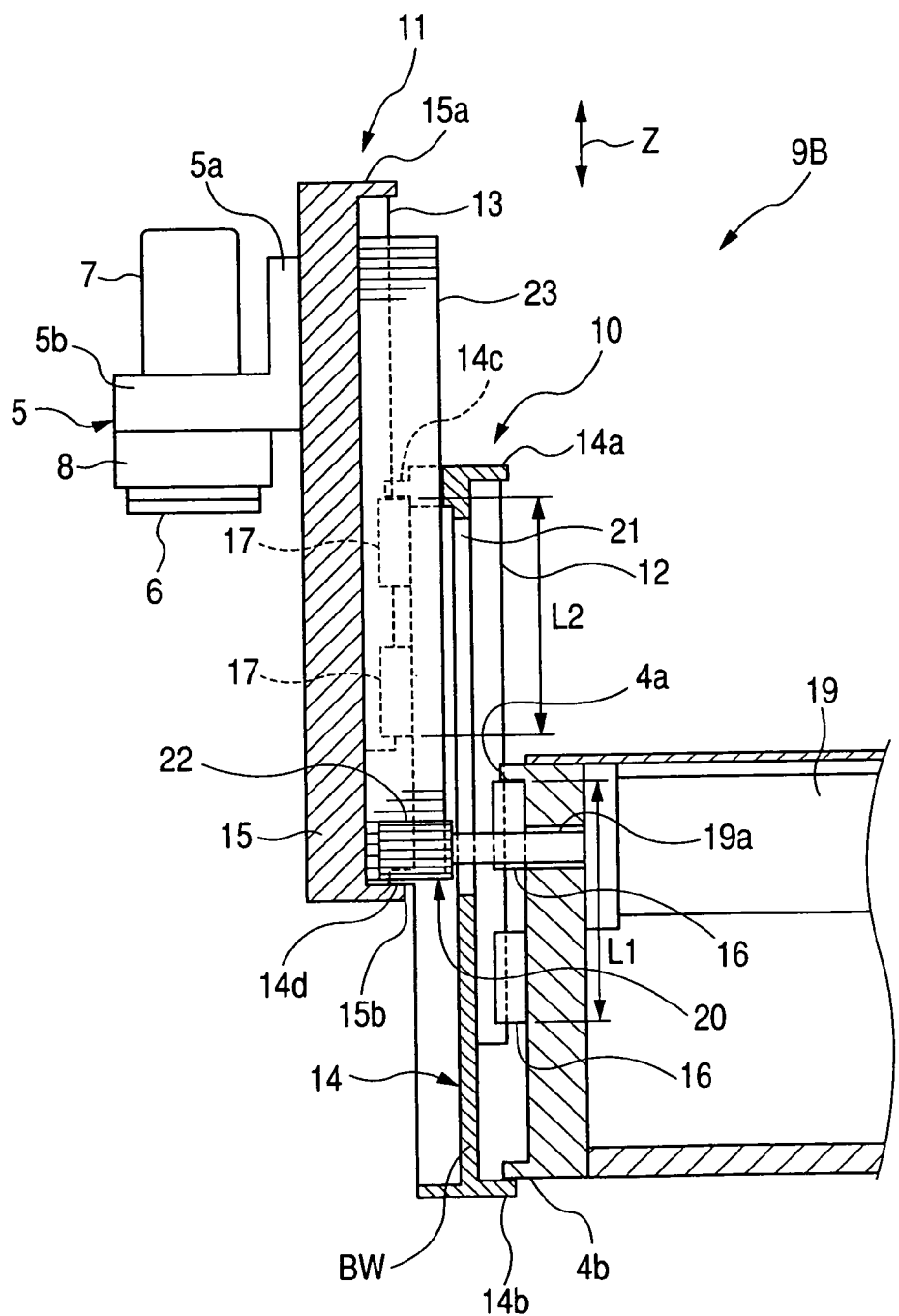
FIG. 9 is an enlarged partially cross sectional one side view of a linearly movable support member of a robot when the linearly movable support member moves downward from an original position according to one modification of the first embodiment.

FIG. 9 schematically illustrates a linearly movable support member 9B of a robot when the linearly movable support member is telescopically moved upward from an original position in order to grip workpieces located higher than the second arm 4 by the gripper GR according to a modification of the first embodiment. The robot of the modification has substantially the same structure as that of the robot R1 of the first embodiment except for some differences described hereinafter. For this reason, like reference characters are assigned to like parts in the robots according to the modification and the first embodiment so that descriptions of the parts of the robot of the modification will be omitted or simplified.

Specifically, in the modification, the first portion 5a of the elevating member 5 is so mounted on the upper end of the other major surface of the second platy movable member 15 in the Z direction as to be telescopically supported by the support member 9B.

The elevating motor 19 is installed in the second arm 4 close to the upper portion of the mounting wall 4w. The drive shaft 19a of the elevating motor 19 rotatably projects through the upper portion of the mounting wall 4w and through the elongated hole 21 up to in front of the one major surface of the second platy movable member 15.

The transfer contact portion between the rack 23 and pinion 22 for transferring rotary motion of the pinion 22 to the rack 23 is located close to the upper end of the second arm 4. This is because the elevating motor 19 is installed in the second arm 4 close to the upper portion of the mounting wall 4w.

In the modification, in the non-operating state of the robot R1, the first and second platy movable members 14 and 15 are located at original positions corresponding the lowest possible positions of the first and second platy movable members 14 and 15.

As well as the first embodiment, when the elevating motor 19 is positively rotated, the support member 9B (the first and second platy movable members 14 and 15) is telescopically moved upward from its original position (see FIG. 9).

Thereafter, the support member 9B (the first and second platy movable members 14 and 15) is telescopically moved downward to its original position.

The configuration of the support member 9B according to the modification achieves the same effects described in the first embodiment.

In each of the first to third embodiments and their modifications, the support member 9 (9A, 9B) consists of the first and second support mechanisms 10 and 11, but it can consist of three or more support mechanisms.

In each of the first to third embodiments and their modifications, the rack and pinion 20 is used as an example of rotary/linear motion converters, but the present invention is not limited to the application.

Specifically, an alternative one of the rotary/linear motion converters, such as a ball screw mechanism consisting of a ball screw shaft and a ball nut, can be applied in place of the rack and pinion 20. When the ball screw mechanism is used in place of the rack and pinion 20, the ball nut is mounted on the projecting end of the drive shaft 19a of the elevating motor 19 so that the ball nut is rotated by rotation of the drive shaft 19a of the elevating motor 19.

The ball screw shaft is threadably engaged with the ball nut. The threadably engaging portion between the ball screw shaft and the ball nut corresponds to a transfer contact portion therebetween for transferring rotary motion of the ball nut to the ball screw shaft as linear motion.

Fourth Embodiment

In each of the first and second embodiments and their modifications, the support member 9 is configured such that:

the first platy movable member 14 is supported to the other end of the second arm 4 to be movable in the Z direction; and the second platy movable member 15 is supported to the first platy movable member 14 to be movable in the Z direction.

The configuration of the support member 9 allows the first and second platy movable members 14 and 15 to be telescopically movable in the Z direction.

In the support member 9, in order to cooperatively move the first and second platy movable members 14 and 15, a speed enhancing mechanism of an orthogonal coordinate robot is disclosed in U.S. Pat. No. 5,612,603 corresponding to Japanese Patent Application Publication No. H09-1481.

In the speed enhancing mechanism, first and second member determining portions are movably mounted on a horizontal arm. The first member determining portion is fixed to a vertical supporter, and the second member determining portion is horizontally moved two times faster than the horizontal movement speed of the horizontal arm.

Specifically, the speed enhancing mechanism is provided with first and second shafts rotatably provided in the horizontal arm, and first to fourth pulleys.

The first pulley is connected with one end of the first shaft, the second pulley is connected with one end of the second shaft, the third pulley is connected with the other end of the first shaft, and the fourth pulley is connected with the other end of the second shaft.

The first and second pulleys are coupled with each other with a first belt, and the third and fourth pulleys are coupled with each other with a second belt. The first member determining portion is fixed to one of the first and second belts, and the second member determining portion is fixed to the other thereof.

Any one of the first and second shafts is rotatably driven by a motor.

In the speed enhancing mechanism disclosed in the US Patent, however, because the first and second belts and the first to fourth pulleys are required, the speed enhancing mechanism may become large. In addition, the first and second belts may be stretched to thereby reduce the location accuracy of each of the first and second member determining portions. Wear on each of the first and second belts may raise much dust. Moreover, in the speed enhancing mechanism, the speed enhancing mechanism is mounted in the horizontal arm together with the motor. This may cause the horizontal arm to increase in weight.

Thus, a rotary/linear converter of a robot according to the fourth embodiment of the present invention aims at:

stably moving a first platy movable member and a second platy movable member constituting a telescopic support member for supporting the elevating member 5 without increasing in size and installing a drive source in each of the first and second platy movable members.

Figure 10:
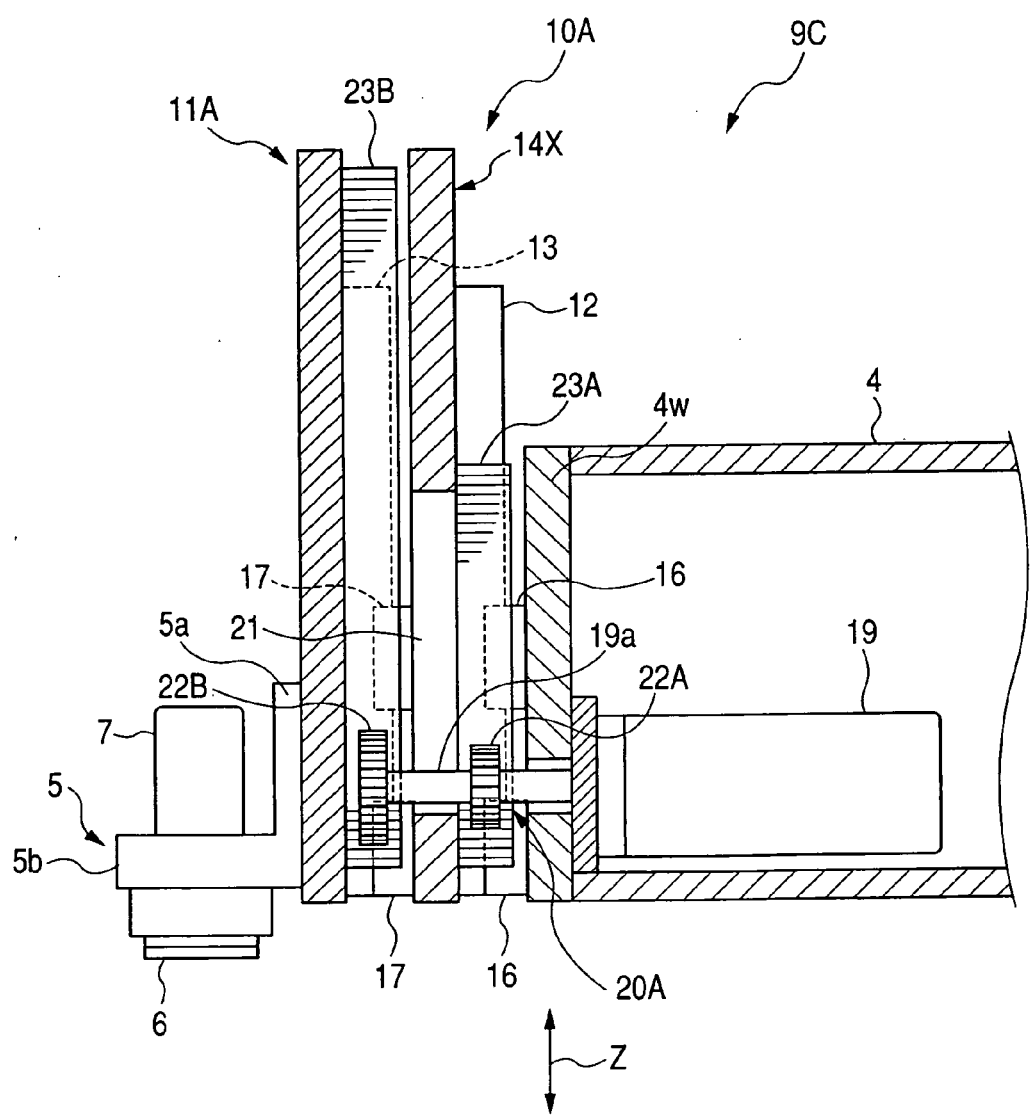
FIG. 10 is an enlarged partially cross sectional one side view schematically illustrating a linearly movable support member of a robot according to a fourth embodiment of the present invention; this linearly movable support member is located at an original position.
Figure 11:
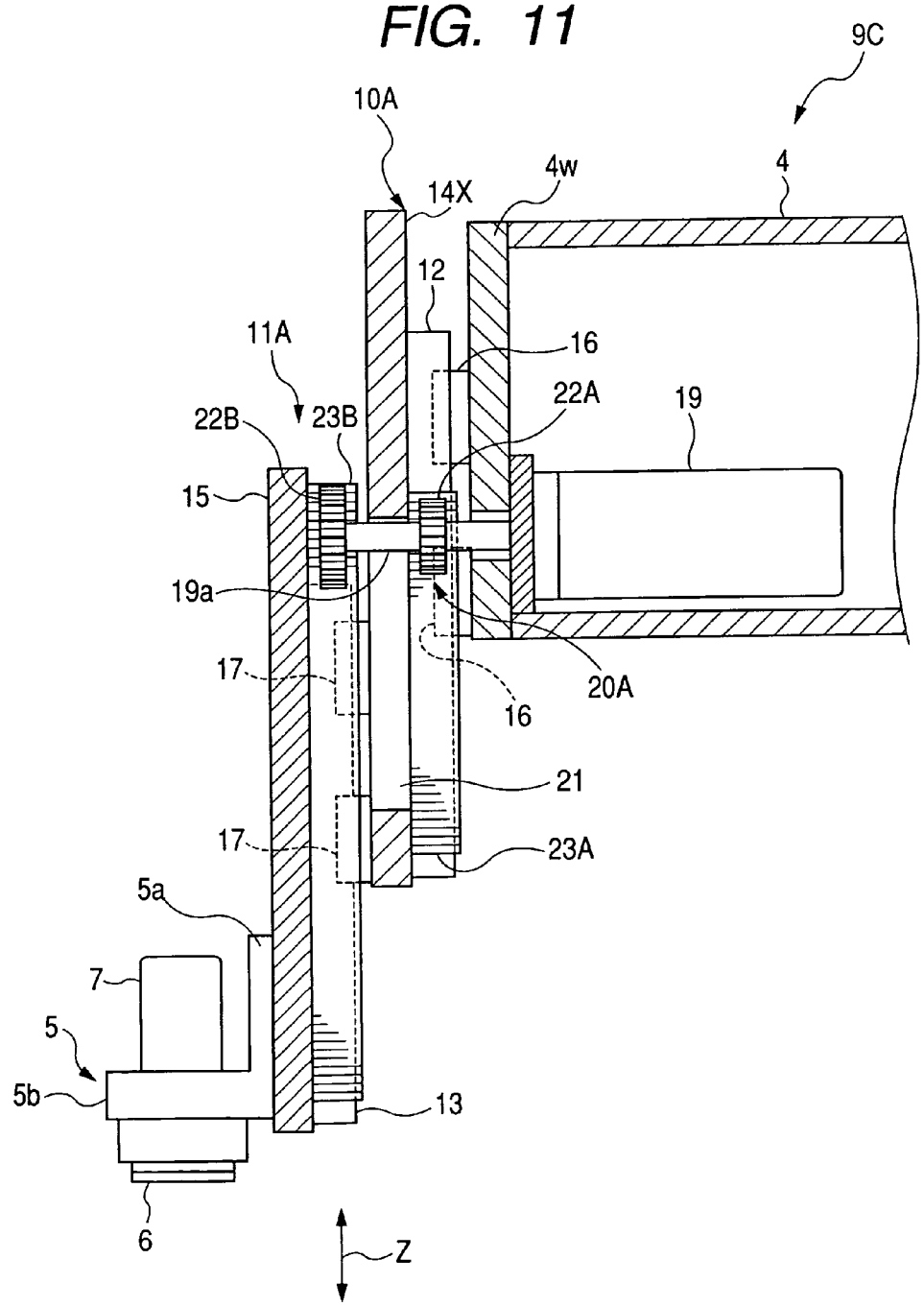
FIG. 11 is an enlarged partially cross sectional one side view of the linearly movable support member when the linearly movable support member moves downward from the original position according to the forth embodiment.

FIG. 10 schematically illustrates a support member 9C and a rotary/linear converter 20A of the robot according to the fourth embodiment.

The robot of the fourth embodiment has substantially the same structure as that of the robot R1 of the first embodiment except for some differences described hereinafter. For this reason, like reference characters are assigned to like parts in the robots according to the first and fourth embodiments so that descriptions of the parts of the robot of the fourth embodiment will be omitted or simplified.

In the fourth embodiment, the support member 9C consists of at least one pair of first and second support mechanisms 10A and 11A. Like the first embodiment, the first and the second support mechanisms 10A and 11A are telescopically linked to each other in the Z direction.

The first support mechanism 10A is made up of a first platy movable member 14X formed with the pair of first rail members 12, and the two pairs of first linear guides 16.

In the fourth embodiment, the first platy movable member 14X has a substantially identical structure of the second platy movable member 15 according to the first embodiment.

Figure 12:
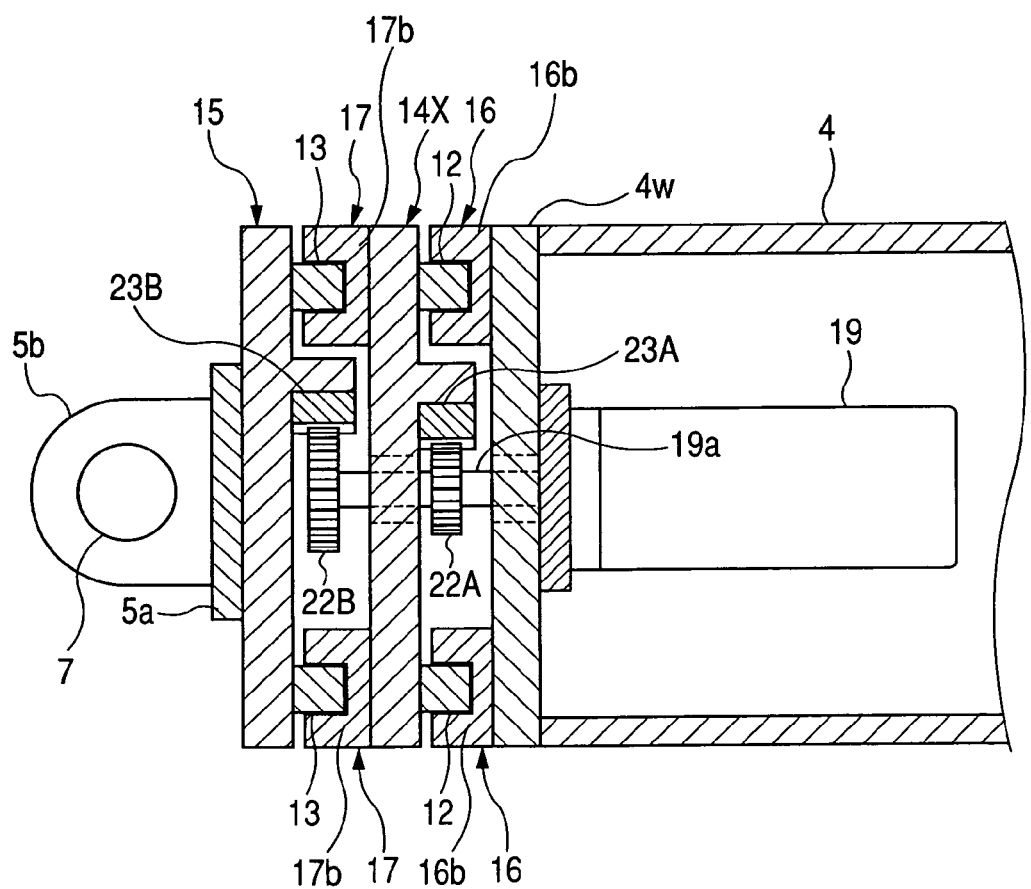
FIG. 12 is an enlarged partially cross sectional plan view of the linearly movable support member illustrated in FIG. 10.

Specifically, the first platy movable member 14X is located in the Z direction such that its one (inner) major surface faces the concave guide grooves 16g (see FIGS. 5A and 12). The first rail members 12 are arranged on the one major surface of the first platy movable member 14X such that they are inserted in the corresponding concave guide grooves 16g of respective pairs to be movable in the Z direction (particularly see FIGS. 5A and 12).

The second support member 11A has a substantially identical structure of the second support member 11 according to the first embodiment.

In the fourth embodiment, the blocks 17b of one pair of the second linear guides 17 are fixedly mounted at their outer surfaces on the middle portion of the other major surface of the first platy movable member 14X in the Z direction such that their concave guide channels 17g are arranged parallel to the Z direction with an interval therebetween.

Similarly, the blocks 17b of the other pair of the second linear guides 17 are fixedly mounted at their outer surfaces on the bottom portion of the other major surface of the first platy movable member 14X in the Z direction such that their concave guide channels 17g are aligned with the concave guide grooves 17g of the corresponding blocks 16b in the Z direction.

Specifically, in the configurations of the first and second support mechanisms 10A and 11A, the second platy movable member 15 is supported by the second linear guides 17 mounted on the other major surface of the first platy movable member 14X to be movable in the Z direction. In addition, the first platy movable member 14X is supported by the first linear guides 16 mounted on the outer surface of the mounting wall 4w of the second arm 4 to be movable in the Z direction.

In other words, the first and second platy movable members 14X and 15 are telescopically supported to the other end of the second arm 4 in the Z direction.

The first portion 5a of the elevating member 5 is so mounted on the lower end of the other major surface of the second platy movable member 15 in the Z direction as to be telescopically supported by the support member 9C.

Like the first embodiment, the elevating motor 19 is installed in the second arm 4 close to the lower portion of the mounting wall 4w. The drive shaft 19a of the elevating motor 19 rotatably projects through the lower portion of the mounting wall 4w and through the elongated hole 21 formed through the first platy movable member 14X. The drive shaft 19a extends up to in front of the one major surface of the second platy movable member 15 in a manner that it does not interfere with the first linear guides 16.

The rotary/linear motion converter 20A according to the fourth embodiment consists of a first pinion 22A, a second pinion 22B, a first rack 23A, and a second rack 23B.

The first pinion 22A is mounted on a middle portion of the drive shaft 19a so that the first pinion 22A is rotated by rotation of the drive shaft 19a of the elevating motor 19.

The first platy movable member 14X is formed at its one major surface with a mounting wall projecting therefrom such that the mounting wall does not interfere with the first linear guides 16. The first rack (toothed bar) 23A is mounted at its back surface opposing the toothed portion on the mounting wall such that the first rack 23A is engaged with the teeth of the first pinion 22A.

The mating portion between the first rack 23A and first pinion 22A, in other words, a transfer contact portion between the first rack 23A and first pinion 22A for transferring rotary motion of the first pinion 22A to the first rack 23A as linear motion is located close to the lower end of the first platy movable member 14A. This is because the elevating motor 19 is installed in the second arm 4 close to the lower portion of the mounting wall 4w.

Similarly, the second pinion 22B is mounted on the projecting end of the drive shaft 19a so that the second pinion 22B is rotated by rotation of the drive shaft 19a of the elevating motor 19.

The second platy movable member 15 is formed at its one major surface with a mounting wall projecting therefrom such that the mounting wall does not interfere with the second linear guides 17. The second rack (toothed bar) 23B is mounted at its back surface opposing the toothed portion on the mounting wall such that the second rack 23B is engaged with the teeth of the second pinion 22B.

The mating portion between the second rack 23B and second pinion 22B, in other words, a transfer contact portion between the second rack 23B and pinion 22B for transferring rotary motion of the second pinion 22B to the second rack 23B as linear motion is located close to the lower end of the second platy movable member 15. This is because the elevating motor 19 is installed in the second arm 4 close to the lower portion of the mounting wall 4w.

In the fourth embodiment, when the first platy movable member 14X and the second platy movable member 15 are telescopically moved, the rotary/linear motion converter 20A is designed to double a moving distance of the second platy movable member 15 as compared with that of the first platy movable member 14X.

Specifically, the second pinion 22B is twice in diameter the first pinion 22A. Note that the "diameter" of each of the first and second pinions 22A and 22B means the diameter of a pitch circle thereof.

Rotation of the drive shaft 19a of the elevating motor 19 allows the first and second platy movable members 14X and 15 to cooperatively move in the Z direction such that a moving distance of the second platy movable member 15 is doubled as compared with that of the first platy movable member 14X.

When the first and second platy movable members 14X and 15 are moved up to the respective lowest possible positions (the maximum extension positions), the top of each of the first rail members 12 is located to be equal to or higher in height than the first linear guides 16 of the first pair, and the top of each of the second rail members 13 is located to be equal to or higher in height than the second linear guides 17 of the first pair.

Note that, in the fourth embodiment, stoppers are omitted from the support member 9C and the second arm 4, but they can be provided for the support member 9C and the second arm 4 as well as the first embodiment.

Next, operations of the robot according to the fourth embodiment in elevating the elevating member 5 (the gripper GR) will be described hereinafter.

In non-operating state of the robot, the first and second platy movable members 14X and 15 are located at original positions corresponding the highest possible positions (maximum contraction positions) in FIG. 10.

From the non-operating state of the robot, in order to grip a workpiece by the gripper GR, the controller C drives at least one of the motors M1 and M2 to swing at least one of the first and second arms 3 and 4 to thereby locate the gripper GR directly over the workpiece to be gripped.

Thereafter, the controller C drives the elevating motor 19 to positively rotate it in order to lower the support member 9 and the gripper GR. This rotates the first and second pinions 22A and 22B, and the rotary motions of the first and second pinions 22A and 22B are converted to respective lower motions of the first and second racks 23A and 23B.

This results that the first and second platy movable members 14X and 15 are cooperatively lowered (expanded) in such a manner that the first and second rail members 12 and 13 are guided along the first and second linear guides 16 and 17, respectively. This allows the gripper GR to be lowered toward the workpiece to be gripped. When the first and second platy movable members 14X and 15 are cooperatively lowered, the second platy movable member 15 is lowered twice faster than the first platy movable member 14X, and the moving distance of the second platy movable member 15 is twice that of the first platy movable member 14X.

When the second platy movable member 15 is lowered so that the gripper GR reaches a proper position to grip the workpiece, the controller C deactivates the elevating motor 19 to stop it. Thereafter, the workpiece is gripped by the gripper GR.

Note that, as described above, the second platy movable member 15 can be lowered to the lowest possible position (the maximum extension position). FIG. 4 illustrates a state where the second platy movable member 15 is lowered to the lowest possible position.

After the workpiece being gripped by the gripper GR, the controller C drives the elevating motor 19 to negatively rotate it so as to raise the support member 9C. This rotates the first and second pinions 22A and 22B, and the rotary motions of the first and second pinions 22A and 22B are converted to respective upper motions of the first and second racks 23A and 23B. This results that the first and second platy movable members 14X and 15 are cooperatively moved upward (shrunken) in such a manner that the first and second rail members 12 and 13 are guided along the first and second linear guides 16 and 17, respectively.

When the first and second platy movable members 14X and 15 are cooperatively moved upward, the second platy movable member 15 is raised twice faster than the first platy movable member 14X, and the moving distance of the second platy movable member 15 is twice that of the first platy movable member 14X.

When the first and second platy movable members 14X and 15 are returned to their original positions, the controller C deactivates the elevating motor 19 to stop it.

As described above, in the robot according to the fourth embodiment, the support member 9C substantially has the same structure as that of the support member 9 according to the first embodiment. Thus, the robot according to the fourth embodiment achieves the same effects as the robot according to the first embodiment.

Particularly, in the rotary/linear motion converter 20A of the robot according to the fourth embodiment, the first pinion 22A with a predetermined diameter and the second pinion 22B with a predetermined diameter larger than that of the first pinion 22A are mounted on the single drive shaft 19a of the elevating motor 19. In addition, the first and second racks 23A and 23B mounted on the first and second platy movable members 14X and 15 are engaged with the first and second pinions 22A and 22B, respectively.

The configuration of the rotary/linear motion converter 20A allows:

the first and second platy movable members 14X and 15 to be cooperatively movable in the Z direction; and a moving distance of the second platy movable member 15 to be longer than that of the first platy movable member 14X.

The rotary/linear motion converter 20A is configured to use a pair of rack and pinions without using belts and pulleys, making it possible to prevent the robot from becoming large and reduce raising dust due to the rotary/linear motion converter 20A. In addition, the elevating motor 4 is installed in the other end of the second arm 4 without being installed in the rotary/linear motion converter 20A, thereby reducing increase in weight of the whole of the support member 9C.

In the fourth embodiment, because the second pinion 22B is twice in diameter the first pinion 22A, the second platy movable member 15 is moved by a distance twice as long as that of the first platy movable member 14X. For this reason, it is possible to minimize the length of each of the first and second platy movable members 14X and 15 located at the original positions in the Z direction while maintaining the moving distance of the second platy movable member 15, which is double of that of the first platy movable member 14X.

In other words, it is unnecessary to increase the length of the second platy movable member 15 from that of the first platy movable member 14X in order to make longer the moving distance of the second platy movable member 15 from that of the first platy movable member 14X.

In the fourteenth embodiment, the ratio of the first pinion 22A to the second pinion 22B in diameter is 1 to 2, but the present invention is not limited to the ratio. Specifically, the ratio of the first pinion 22A to the second pinion 22B can be determined such that the second pinion 22B is longer in diameter than the first pinion 22A.

The first and second pinions 22A and 22B are mounted on the drive shaft 19a of the elevating motor 19, but they can be mounted on a rotating member coupled to the drive shaft 19a of the elevating motor 19.

In the first to fourth embodiments and their modifications, the linearly support members 9 and 9A to 9C are supported to the other end of the second arm 4 to be movable in the Z direction parallel to the rotational axes J1 and J2, but the present invention is not limited to the structures. Specifically, the linearly support members 9 and 9A to 9C can be supported to the other end of the second arm 4 to be movable in a direction orthogonal or oblique to the rotational axes J1 and J2.

In the first to fourth embodiments and their modifications, the present invention is applied to the SCARA robots, but can be applied to Cartesian Coordinate robots or arm robots having a linearly movable member.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A robot comprising:
an arm having opposing first and second sides in a predetermined direction;
a support member comprising:
a first movable member supported to the arm to be reciprocable with respect to one of the first and second sides of the arm in the predetermined direction; and
a second movable member reciprocably linked to the first movable member in the predetermined direction, the first and second movable members being telescopically supported to the arm, the second movable member being configured such that a gripper for gripping a workpiece is attachable thereto;
a first rotary drive source installed in the arm and working to create rotary motion; and
a rotary/linear motion converter comprising:
a pinion coupled to the first rotary drive source; and
a rack contacted to the pinion and linked to the second movable member,
the rotary/linear motion converter working to:
receive, by the pinion, the rotary motion created by the first rotary drive source with which the pinion is directly physically connected; and
transfer the received rotary motion as linear motion to the rack through a transfer contact portion between the pinion and the rack to thereby move the rack together with the support member in the predetermined direction,
the movement of the rack together with the second movable member of the support member causing the first movable member to move in the predetermined direction, after stop of the movement of the first movable member by a preset stroke, the linear motion being configured to further move the rack together with the second movable member in the predetermined direction, and
the transfer contact portion between the pinion and the rack being located offset to the one of the first and second sides of the arm relative to the other thereof.

2. A robot according to claim 1, wherein the support member comprises a flange to which the gripper is attachable, further comprising:
a second rotary drive source attached to the support member and working to rotate the flange.

3. A robot comprising:
an arm having opposing first and second sides in a predetermined direction;
a support member supported to the arm to be reciprocable with respect to one of the first and second sides of the arm in the predetermined direction, the support member being configured such that a gripper for gripping a workpiece is attachable thereto;
a first rotary drive source installed in the arm and working to create rotary motion; and
a rotary/linear motion converter comprising:
a rotary member coupled to the first rotary drive source; and
a linear movable member contacted to the rotary member and linked to the support member,
the rotary/linear motion converter working to:
receive, by the rotary member, the rotary motion created by the first rotary drive source with which the rotary member is directly physically connected; and
transfer the received rotary motion as linear motion to the linear movable member through a transfer contact portion between the rotary member and the linear movable member to thereby move the linear movable member together with the support member in the predetermined direction,
the transfer contact portion between the rotary member and the linear movable member being located offset to the one of the first and second sides of the arm relative to the other thereof,
wherein the support member comprises a first movable member supported to the arm to be reciprocable with respect to the one of the first and second sides of the arm in the predetermined direction, and a second movable member reciprocably linked to the first movable member in the predetermined direction, the first and second movable members being telescopically supported to the arm, the second movable member being configured such that the gripper is attachable thereto, further comprising:

a biasing member to bias the first and second movable members to overlap in a plane perpendicular to the predetermined direction;

a pulley rotatably supported to the first movable member; and a strip member having one and other ends, the one end being coupled to the arm, the other end being coupled to the second movable member, and a portion of a remaining of the strip member except for the one and the other ends being mounted on the pulley, the biasing member, the pulley, and the strip member causing a moving distance of the first movable member in the predetermined direction to be substantially a half of that of the second movable member in the predetermined direction.

4. A robot comprising:

an arm having opposing first and second sides in a predetermined direction;

a support member supported to the arm to be reciprocable with respect to one of the first and second sides of the arm in the predetermined direction, the support member being configured such that a gripper for gripping a workpiece is attachable thereto;

a first rotary drive source installed in the arm and working to create rotary motion; and a rotary/linear motion converter comprising:

a rotary member coupled to the first rotary drive source; and a linear movable member contacted to the rotary member and linked to the support member, the rotary/linear motion converter working to:

receive, by the rotary member, the rotary motion created by the first rotary drive source with which the rotary member is directly physically connected; and transfer the received rotary motion as linear motion to the linear movable member through a transfer contact portion between the rotary member and the linear movable member to thereby move the linear movable member together with the support member in the predetermined direction, the transfer contact portion between the rotary member and the linear movable member being located offset to the one of the first and second sides of the arm relative to the other thereof, wherein the support member comprises a first movable member supported to the arm to be reciprocable with respect to the one of the first and second sides of the arm in the predetermined direction, and a second movable member reciprocably linked to the first movable member in the predetermined direction, the first and second movable members being telescopically supported to the arm, the second movable member being configured such that the gripper is attachable thereto, wherein the linear moveable member comprises:

a first rack mounted on the first movable member; and a second rack mounted on the second movable member, and the rotary/linear motion converter comprises:

a transfer member coupled to the first rotary drive source to be rotatable by the rotary motion created thereby, the transfer member projecting through the first rack up to in front of the second rack;

a first pinion mounted on the transfer member and engaged with the first rack; and a second pinion mounted on the transfer member and engaged with the second rack, the second pinion having a diameter being longer than that of the first pinion, the rotary/linear motion converter being configured such that rotation of the transfer member by the rotary motion created by the first rotary drive source allows the first and second movable members to cooperatively move in the predetermined direction, a moving direction of the second movable member being longer than that of the first movable member.

5. A robot according to claim 4, further comprising:

a first rail member mounted on the first movable member and extending in the predetermined direction;

at least one first linear guide mounted on the second arm and configured to linearly guide the first rail in the predetermined direction;

a second rail member mounted on the second movable member and extending in the predetermined direction; and at least one second linear guide mounted on the first movable member and configured to linearly guide the second rail in the predetermined direction.

6. A robot according to claim 5, wherein the at least one first linear guide includes a plurality of the first linear guides, and the plurality of first linear guides are arranged in the predetermined direction with intervals therebetween, and the at least one second linear guide includes a plurality of the second linear guides, and the plurality of second linear guides are arranged in the predetermined direction with intervals therebetween.

7. A robot according to claim 5, wherein, when the first and second movable members are expanded to be located at their possible maximum lengths from the one of the first and second sides of the arm in the predetermined direction, the at least one first linear guide is arranged such that a length of one end thereof in an opposite direction of the expanding direction of the first movable member is equal to or lower than that of one end of the first rail in the opposite direction of the expanding direction of the first movable member, and the at least one second linear guide is arranged such that a length of one end thereof in an opposite direction of the expanding direction of the second movable member is equal to or lower than that of one end of the second rail in the opposite direction of the expanding direction of the second movable member.

8. A robot according to claim 4, wherein the diameter of the second pinion being twice than that of the first pinion.

* * * * *

UNITED STATES PATENT AND TRADEMARK OFFICE
CERTIFICATE OF CORRECTION

PATENT NO. : 8,240,972 B2
APPLICATION NO. : 12/153336
DATED : August 14, 2012
INVENTOR(S) : Takamasa Tokumitsu Page 1 of 1

It is certified that error appears in the above-identified patent and that said Letters Patent is hereby corrected as shown below:

On the title page item (73), replace Assignee: "Denso Wave Corporation, Tokyo (JP)" with "Denso Wave Incorporated, Tokyo (JP)"

Signed and Sealed this
Twentieth Day of August, 2013

Teresa Stanek Rea
*Acting Director of the United States Patent and Trademark Office*